(12) United States Patent
Ho

(10) Patent No.: US 7,239,103 B2
(45) Date of Patent: Jul. 3, 2007

(54) SYNCHRONOUS MOTOR STARTUP LOCK DETECTION CIRCUIT AND METHOD

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 193 days.

(21) Appl. No.: 11/066,690

(22) Filed: Feb. 25, 2005

(65) Prior Publication Data

US 2006/0193090 A1    Aug. 31, 2006

(51) Int. Cl.
*H02P 21/06* (2006.01)
(52) U.S. Cl. .................. 318/434; 318/430; 388/903
(58) Field of Classification Search ........ 318/430–434; 388/903; 361/23–34
See application file for complete search history.

(56) References Cited

U.S. PATENT DOCUMENTS

| | | | | | |
|---|---|---|---|---|---|
| 3,576,485 | A | * | 4/1971 | Coons et al. ............... | 318/434 |
| 4,377,784 | A | * | 3/1983 | Saito et al. ................. | 324/772 |
| 4,562,389 | A | * | 12/1985 | Jundt et al. ................. | 318/432 |
| 4,647,825 | A | * | 3/1987 | Profio et al. ................ | 318/295 |
| 4,808,932 | A | * | 2/1989 | Schulz et al. ............... | 324/545 |
| 4,896,089 | A | * | 1/1990 | Kliman et al. .............. | 318/701 |
| 5,457,364 | A | * | 10/1995 | Bilotti et al. ............... | 318/434 |
| 5,739,698 | A | * | 4/1998 | Bowers et al. ............. | 324/772 |
| 6,055,120 | A | * | 4/2000 | Schirle .................... | 360/73.03 |
| 6,064,172 | A | * | 5/2000 | Kuznetsov .................. | 318/716 |

\* cited by examiner

*Primary Examiner*—Bentsu Ro
(74) *Attorney, Agent, or Firm*—Ostrolenk, Faber, Gerb & Soffen, LLP

(57) ABSTRACT

A startup failure detection system provides an indication of motor startup failure based on a flux amplitude signal value. The flux amplitude signal is derived from motor flux estimations in combination with a rotor angle estimation. The flux amplitude signal value is compared to an upper and lower threshold value, and a startup failure is indicated if the flux amplitude signal value is outside the range determined by the upper and lower threshold value. The motor drive system can be set to attempt a restart when a motor drive startup failure is detected, with the retrial current, duration and the total number of retrials being user selectable.

31 Claims, 5 Drawing Sheets

SYNCHRONOUS MOTOR STARTUP LOCK DETECTION CIRCUIT AND METHOD

BACKGROUND OF THE INVENTION

1. Field of the Invention

The present invention is related generally to sensorless synchronous motor drives, and more particularly to drives with startup failure detection.

2. Description of Related Art

Permanent magnet synchronous machines (PMSMs) are widely used as electric motors because of the development of high quality power electronics and powerful signal processing microprocessors. PMSM devices are typically cheaper than DC machines and can have higher performance characteristics than DC machines. PMSM devices are also attractive of their high efficiency, low maintenance costs and high torque output for a given size dimension.

The operation of a PMSM typically calls for synchronization of the rotor angle of the motor to obtain the desired output characteristics. Prior PMSMs included position sensors, such as encoders or resolvers to contribute to synchronizing the phase excitation with the rotor position. However, the presence of an encoder or resolver in many applications and environments has several drawbacks, including cost, reliability, machine dimensions and noise immunity.

A variety of techniques to detect rotor position in PMSM motors have been developed to obtain a sensorless rotor position feedback that permit the elimination of position sensors. In some cases, the sensorless rotor position detection techniques focus on the rotor saliency and local saturation of motor coils. These types of systems have internal permanent magnets for which saliency is readily measured. Rotor saliency can also be detected by injecting a high frequency sinusoidal voltage or other disturbance that is responsive to the position of the permanent magnet in relation to the motor coils. However, signal injection produces other problems related to efficiency or audible noise.

Other types of machine systems with minimal saliency like surface mounted PM motors, use back EMF to sense rotor angle. Back EMF is also observed to extract information to estimate flux in the motor coils.

Back EMF sensorless techniques for the sensorless control of a PMSM motor present difficulties at start up and during operation at low speeds. Although rotor position may be detected using the above techniques, even when the rotor is at a standstill, controlling a PMSM motor with a surface mounted PM at startup presents problems because no saliency measurement is readily available.

During a sensorless motor drive startup, motor torque is developed to overcome drive stiction and friction to rotate and accelerate the rotor. Motor shaft stiction and friction may vary dramatically dependent upon the applied load characteristics. For example, the stiction of an outdoor pump exposed to low temperatures may increase dramatically from a nominal value. In some instances, the motor shaft may be partially jammed, which can prevent motor startup rotation. In such a case, startup failure may occur, meaning that the drive torque per ampere ratio decreases dramatically and the motor is unable to accelerate. In addition, because of the difficulties with detecting rotor position in a sensorless drive at zero or low speed, the motor speed information may not be as accurate.

SUMMARY OF THE INVENTION

In accordance with the present invention, there is provided a method for quickly determining a startup failure condition in a PMSM motor. A motor flux range is provided for determining a successful startup so that a startup failure with a flux level outside of the range can be detected. The motor flux range can be adjusted depending upon the application. During a normal start up, the motor flux builds up and stays within a certain prescribed range. The motor flux level is extracted from a sensorless PMSM drive for comparison with the range to determine whether a startup failure has occurred.

According to another feature of the present invention, an automatic restart sequence is provided when a startup failure is detected. Upon detection of a startup failure, the PMSM motor drive initializes and enters a restart cycle. In accordance with the present invention, the PMSM drive can be configured for a particular number of startup retries, with selectable restarting torque for the startup retry attempts.

In accordance with another feature of the present invention, the startup failure detection is provided as an addition to a rotor angle estimator circuit, such as that described in copending application Ser. No. 10/294,201, filed Nov. 12, 2002 entitled ROTOR ANGLE ESTIMATION FOR PERMANENT MAGNET SYNCHRONOUS MOTOR DRIVE (IR-2130). The startup failure detector obtains an input flux amplitude from an output of a vector rotator in the rotor angle estimator and compares the flux amplitude to a high and low threshold value to determine if the flux amplitude is within an appropriate range. If the flux amplitude from the rotor angle estimator is out of range, a start failure condition is indicated and the drive is set to a default sequence to turn off the motor control signals, and, if desired, restart the startup sequence with increased startup current (configurable).

For a successful startup, the motor flux level should stay within a certain band limit. If motor flux is out of the band limit, a startup failure can be detected. Upon detection of this startup failure, the drive will reinitialize and enter a restart cycle. The drive can be configured for a variable number of startup retries and variable values for the restarting torque of the startup retries. The motor flux level can be easily extracted from the sensorless control drive as described in application Ser. No. 10/294,201 (IR2130), previously mentioned.

Other features and advantages of the present invention will become apparent from the following description of the invention, which refers to the accompanying drawings.

DETAILED DESCRIPTION OF THE PREFERRED EMBODIMENTS

Figure 1A:
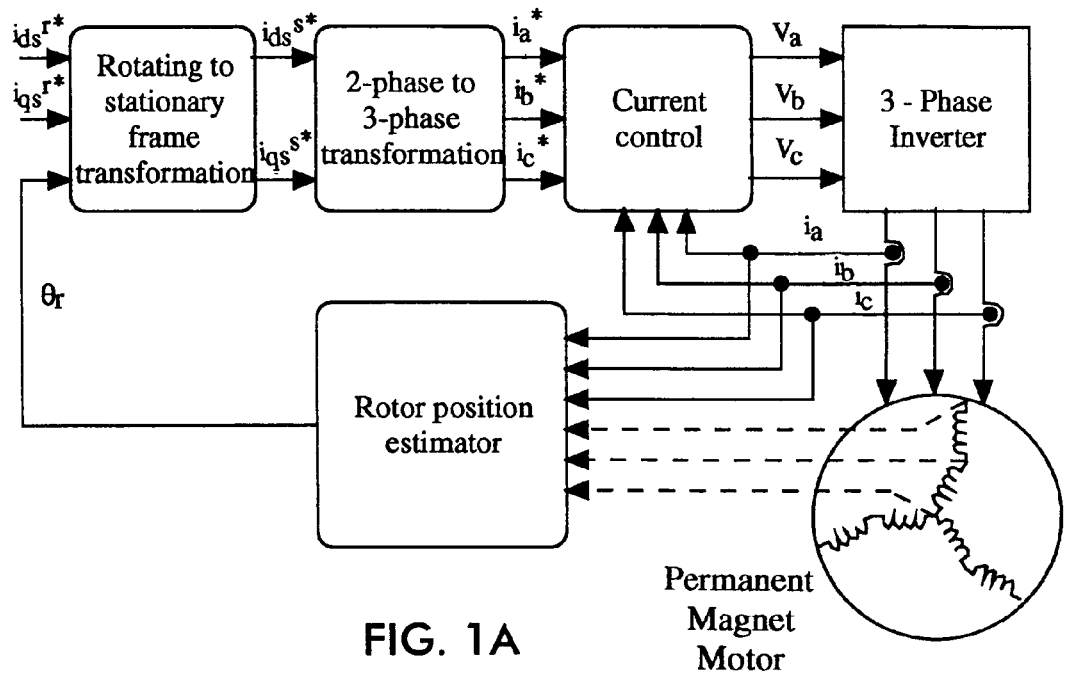
FIGS. 1a and 1b are schematic block diagram of a permanent magnet synchronous motor drive control system and its control system respectively.
Figure 1B:
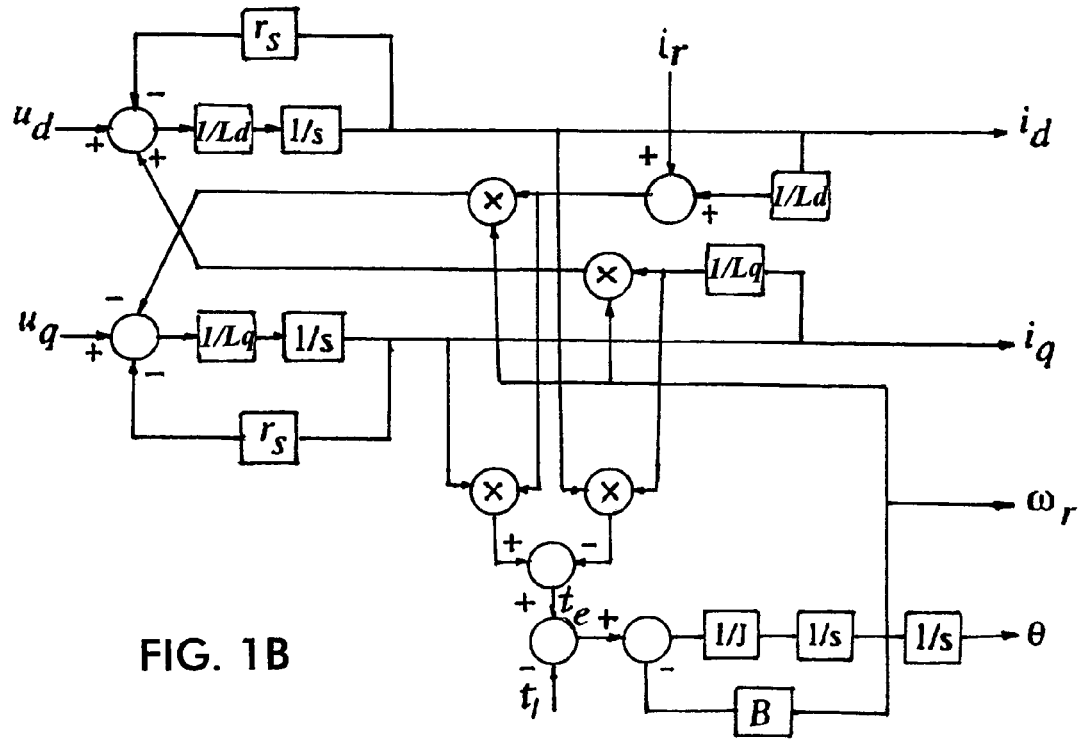

FIG. 1A illustrates a motor drive system with sensorless position detection. FIG. 1B illustrates a control system diagram for sensorless control with inputs Ud and Uq and outputs id, iq and θ, representative of the motor currents and rotor position.

Figure 2:
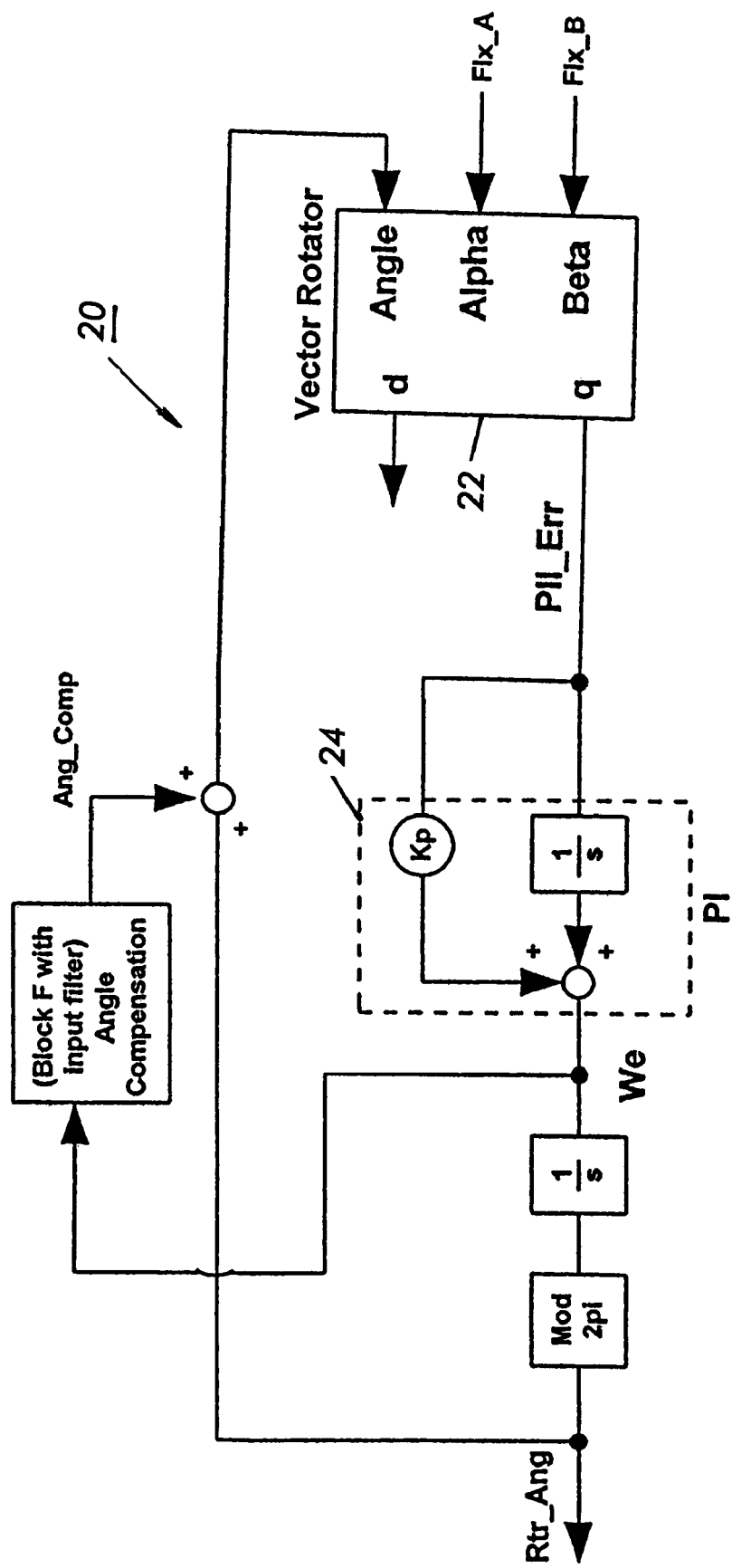
FIG. 2 is a system block diagram for a rotor angle estimator.

Referring now to FIG. 2, a system block diagram for a rotor angle estimator is shown as diagram 20. The rotor angle estimator shown in diagram 20 operates with a phase lock loop in which a phase lock loop error PLL_ERR is determined based on a combination of the estimated rotor angle and flux signals designated as Alpha and Beta. The operation of the rotor angle estimator is detailed in related application Ser. No. 10/294,201 (IR-2130), the contents of which are incorporated herein by reference. Vector rotator block 22 provides two outputs D and Q, of which only output Q is used for the closed loop tracking of flux. The phase lock loop operates by forcing the phase lock loop error PLL_ERR to zero in a steady state. A proportioned integrator PI compensator 24 contributes to forcing output Q, and thus the value of PLL_ERR, to zero. Although output D of vector rotator block 22 is not used for rotor angle estimation, the signal on output D includes information about the motor flux amplitude, and is used according to the present invention for detection of startup failure.

Figure 3:
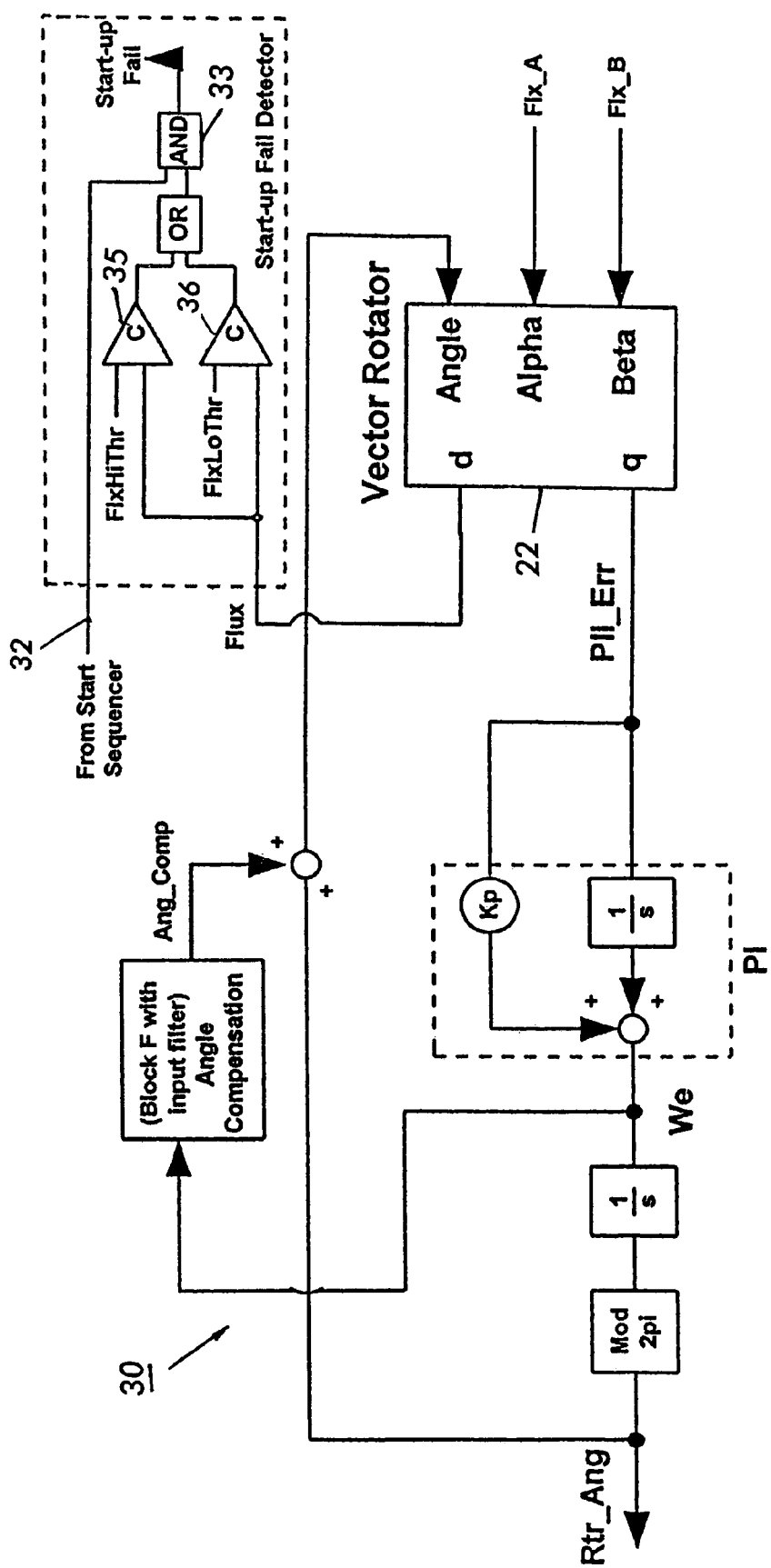
FIG. 3 is a system block diagram for a startup detection circuit.

Referring now to FIG. 3, a system block diagram for startup failure detection is illustrated as diagram 30. FIG. 2 illustrates all the same features provided in the rotor angle estimator of diagram 20, with the addition of startup failure detection circuitry. Vector rotator block 22 provides a flux amplitude signal from output D, which is used in the evaluation of a threshold range for startup failure detection. Initially, during drive startup, the flux amplitude signal on output D is not valid due to transients in the system upon startup. Accordingly, a start sequencer or control signal 32 is used to enable startup failure detection at AND gate 33. Once the flux amplitude signal from output D is valid, it may be used to determine whether the flux amplitude falls within the specified range to determine whether a startup failure has occurred. Accordingly, control signal 32 enables the startup detection failure indication after a specified delay to enable the flux amplitude signal to become valid and obtain a proper reading on a range of the flux amplitude level.

The flux amplitude supplied by output D from vector rotator block 22 is applied to an input of comparators 35, 36 to determine whether the flux amplitude signal falls within a given range. The flux amplitude signal is preferably compared to a high threshold FLXHITHR and a lower threshold FLXLOTHR in parallel to determine at once whether the flux amplitude is within the range specified by thresholds FLXHITHR and FLXLOTHR. The thresholds FLXHITHR and FLXLOTHR are applied to the respective comparator inputs of comparators 35, 36, along with the flux amplitude signal. A result of the comparison is provided on an output of comparators 35, 36. If the flux amplitude is below the upper threshold FLXHITHR, the output of comparator 35 is a logic zero, or low level. If the flux amplitude is greater than the lower threshold FLXLOTHR, the output of comparator 36 is a logic zero or low level as well. In a normal startup sequence, the outputs of comparators 35, 36 are both zero and no startup failure detection indication is produced. The comparison is performed after certain time interval (configurable) has elapsed. This is done to ensure sufficient time for normal flux build-up.

If the flux amplitude is above the high threshold FLXHITHR the output of comparator 35 is set to a logic "1", or high level, to indicate that the flux amplitude is out of the bounds of the high flux threshold. If the flux amplitude is below the lower threshold FLXLOTHR, the output of comparator 36 is set to a logic "1", or high level, to indicate the flux amplitude is out of bounds of the low flux threshold. If either of the outputs of comparators 35, 36 produces a logic "1", or high level, a startup failure detection is indicated.

Figure 4A:
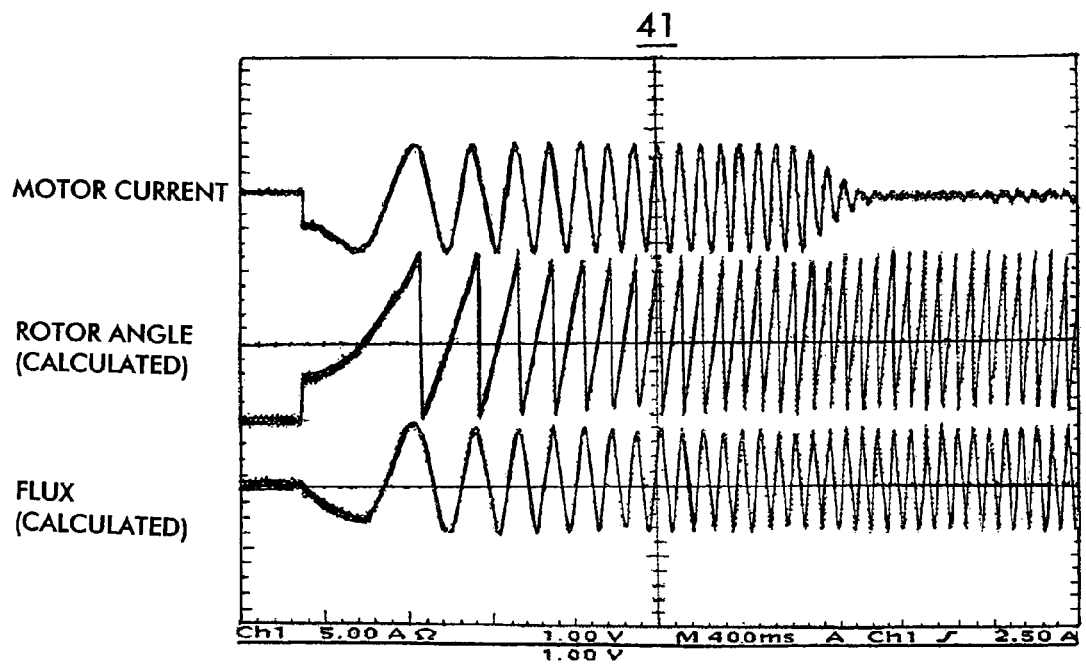
FIGS. 4a–4c are graphical plots illustrating system parameters according to the present invention.
Figure 4B:
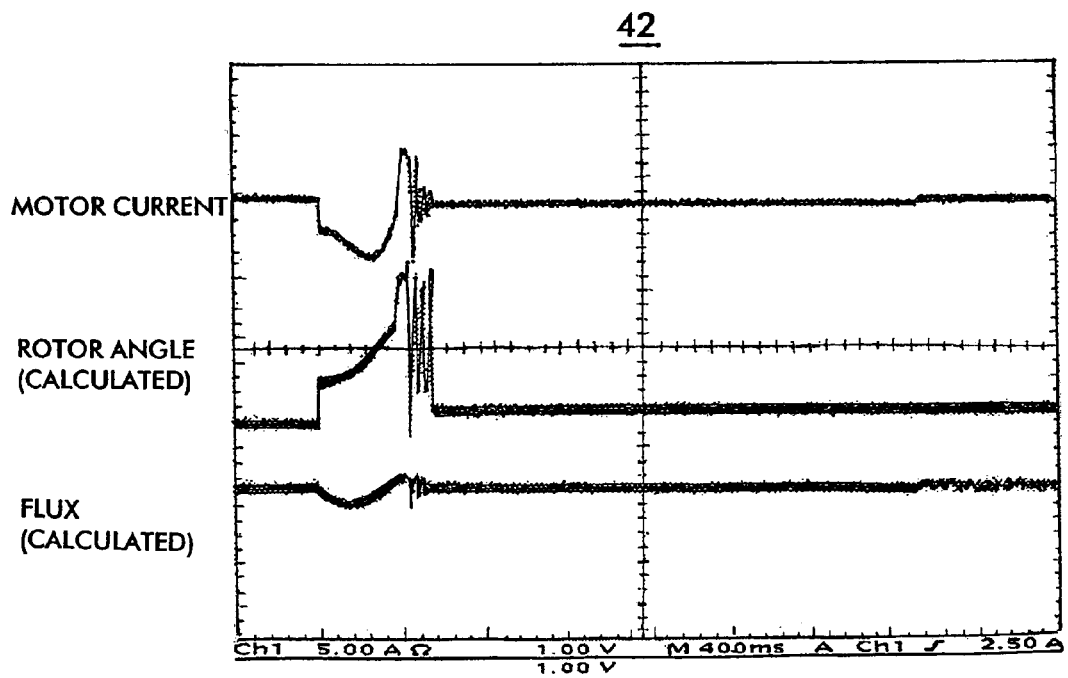
Figure 4C:
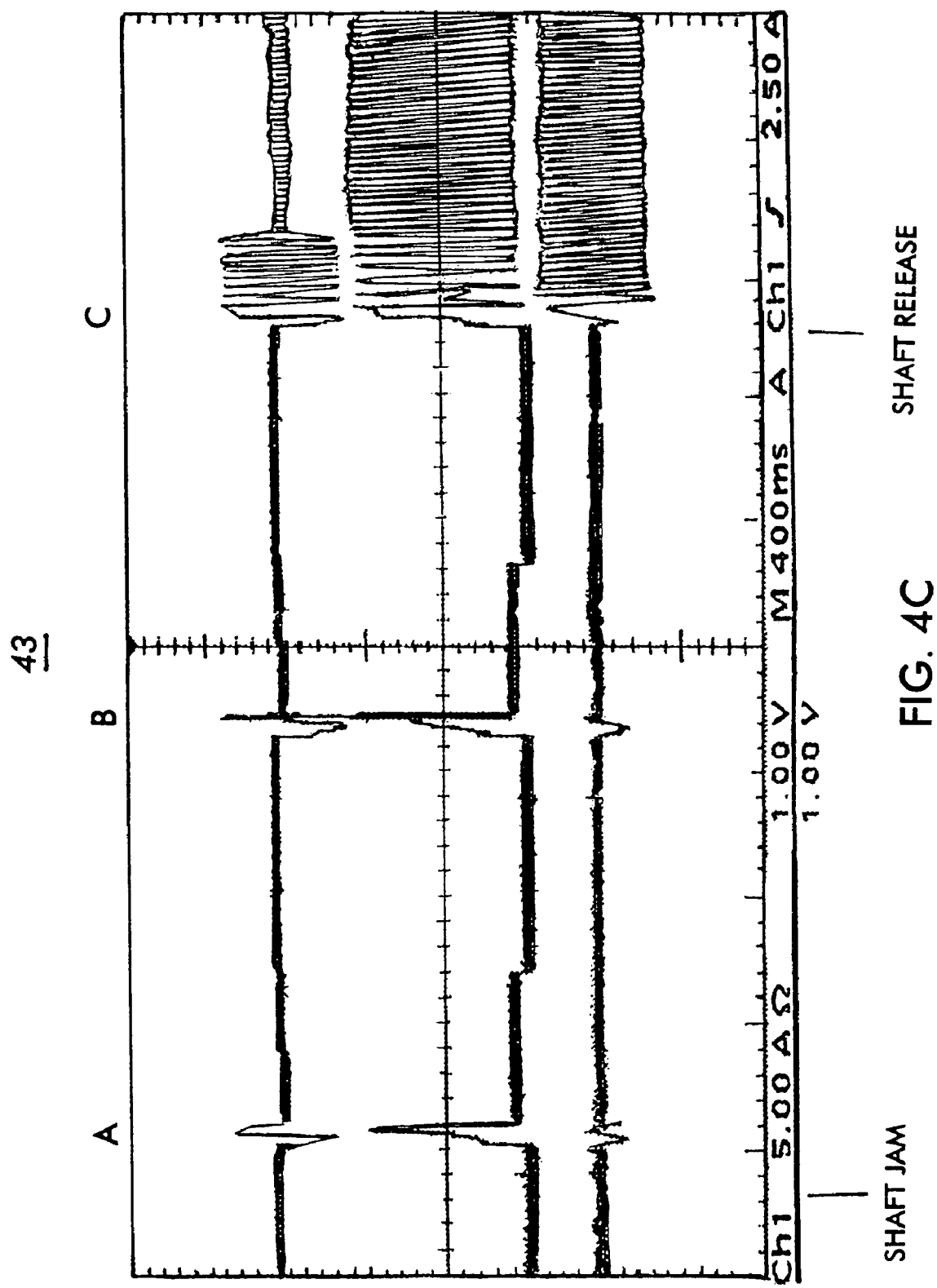

Referring now to FIGS. 4a–4c, experimental results in accordance with the present invention are illustrated in graphical plots 41–43. Graphical plot 41 in FIG. 4a shows the results of a normal startup for motor current, calculated rotor angle and calculated flux. Graphical plot 42 in FIG. 4b illustrates the detection of a startup failure. In this instance, the motor shaft is jammed and the flux amplitude falls outside the threshold boundaries, leading to a motor shutdown. In graphical plot 43 in FIG. 4c, the motor shaft is initially jammed and a startup failure detection occurs. In accordance with a feature of the present invention, an automatic restart is initiated in an attempt to determine if the jammed shaft has become free, or whether the locked condition is removed. In graphical plot 43 illustrated in FIG. 4c, three automatic restart attempts are made at points A, B and C, with the shaft of the motor being released prior to the restart attempts at point C. Accordingly, on the third attempt to restart the motor, the shaft is not jammed and the motor can start and operate as normal. In the case of each restart attempt, the flux amplitude is measured against the high and low thresholds FLXHITHR and FLXLOTHR to determine whether the motor shaft is jammed or free.

A number of variations are possible in realizing the present invention, including varying the number of automatic restart attempts, varying the delay time between the restart attempts, varying the power supply to the motor during a restart attempt, and so forth. For example, in one embodiment of the present invention, once a startup failure is detected, the next automatic restart can apply a higher startup current level to the motor in an attempt to free the blocked shaft. The amount of current and the period of time over which it is applied can be configured, depending upon application and environment, for instance, to attempt to restore motor shaft operation.

For example, the flux amplitude parameters may change over time as the motor drive system ages or deteriorates due to environmental conditions, or is subjected to high loading or harsh environments. The startup current limit thresholds may be varied to adapt to the motor drive system as it ages so that startup failure detection in the motor drive system can continue to operate consistently.

Furthermore, upon restart, the pulses, or more specifically, the retrial energy which may have any waveform, supplied to the motor can be varied in a number of different configurations. The number of restart pulses or retries may be varied, for example, so that three restarts may be attempted before a startup failure is observed. The period of time between pulses may also be varied, for example longer or shorter intervals may be used between restart attempts. The duration of the pulses or retries may be varied, so that longer or shorter pulses are applied to the motor to provide more or less current and torque.

In another variation of the present invention, the high and low threshold values can be preset in hardware, or programmable. For example, if a motor is used in different applications, or is subject to varying conditions for startup, a selectable set of threshold values can be provided to the comparators, based on manual settings or automatic sensing.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A circuit for detecting startup failure in a motor drive system, comprising:
   a motor flux amplitude signal generator for generating a motor flux amplitude signal based on motor flux or rotor angle estimations;
   a comparator having a plurality of inputs with a first input coupled to the generator for receiving the amplitude signal and having an output for producing a signal indicative of a comparison result between two or more of the plurality of inputs;
   a second input in the plurality of inputs coupled to a reference value for comparison with the amplitude signal; and
   the comparator output operable to indicate when the amplitude signal is above or below the reference value, thereby indicating a startup failure.

2. The circuit according to claim 1, wherein the reference value is a low threshold and the comparator produces an output to indicate when the amplitude signal is below the low threshold.

3. The circuit according to claim 1, wherein the reference value is a high threshold and the comparator output indicates when the flux amplitude signal is above the high threshold.

4. The circuit according to claim 1, further comprising another comparator having a plurality of inputs, the flux amplitude signal being applied to one of the inputs of the another comparator; and
   another reference value applied to a second input of the another comparator to produce a second indication of the comparison between the flux amplitude signal and the another reference value.

5. The circuit according to claim 4, further comprising an OR gate coupled to the outputs of the comparators and operable to produce a startup failure signal if any of the comparators produces a startup failure signal.

6. The circuit according to claim 1, further comprising a gate coupled to the output of the comparator for selectively permitting or preventing passage of the comparator output signal.

7. The circuit according to claim 6, further comprising an enable signal coupled to the gate for selectively permitting or preventing passage of the comparator output signal.

8. The circuit according to claim 7, wherein the enable signal is operable to enable the gate after the flux amplitude signal has become valid.

9. The circuit according to claim 1, further comprising a startup generation circuit for supplying start up retrial energy to the motor, the start up retrial generation circuit being operable to supply start up energy to the motor after detection of a startup failure to attempt to restart the motor.

10. The circuit according to claim 9, wherein the start up retrial energy supplied to the motor has a configurable duration.

11. The circuit according to claim 9, wherein a selectable number of start up retrials are applied to the motor after a startup failure is detected.

12. The circuit according to claim 9, the interval between start up retrials is configurable.

13. A method for detecting startup failure in a motor drive system, comprising:
   producing a flux amplitude signal derived from motor flux or rotor angle estimations;
   comparing the flux amplitude signal to a reference value to produce a startup failure indication; and
   discontinuing startup of the motor when a startup failure indication is produced.

14. The method according to claim 13, further comprising reinitializing the motor drive system when a startup failure is detected.

15. The method according to claim 13, further comprising attempting to restart the motor after a startup failure is detected.

16. The method according to claim 13, further comprising comparing the flux amplitude signal to a low threshold value as the reference value, and indicating a startup failure when the flux amplitude signal is less than the low threshold value.

17. The method according to claim 13, further comprising comparing the flux amplitude signal to a high threshold as the reference value and indicating a startup failure when the flux amplitude signal is greater than the high threshold value.

18. The method according to claim 13, further comprising comparing the flux amplitude signal to another reference value to determine if a startup failure has occurred.

19. The method according to claim 18, further comprising combining the comparisons of the reference values to obtain a range between the reference values, wherein a motor startup failure is indicated if the flux amplitude signal is outside the range.

20. The method according to claim 13, further comprising providing a start up retrial to the motor after a startup failure is detected.

21. The method according to claim 20, further comprising varying the duration of the start up retrial.

22. The method according to claim 20, further comprising providing a selectable number of start up retrials to the motor after detection of a startup failure.

23. The method according to claim 22, further comprising configuring an interval of time between start up retrials applied to the motor after detection of a startup failure.

24. A system for detecting motor startup failure, comprising:
   a device for producing a flux amplitude signal based on motor flux or rotor angle estimations;
   a comparator coupled to the device for receiving the flux amplitude signal, the comparator having a reference value input, whereby the comparator outputs a signal indicative of a comparison between the flux amplitude signal and the reference value; and
   a discontinuation section coupled to the comparator output and operable to discontinue startup of the motor drive based on the comparator output.

25. The system according to claim 24, further comprising a restart section for reinitializing and restarting the motor drive system after detection of a startup failure.

26. The system according to claim 24, wherein the reference value is programmable.

27. The system according to claim 24, wherein the device, comparator and startup failure indication are implemented in software.

28. The system according to claim 24, further comprising a restart generation component for restarting the motor, the restart generation component being operable to supply energy to the motor after detection of a startup failure.

29. The system according to claim 28, wherein the restart generation component is configurable to vary the duration of the restart energy supplied to the motor after detection of a startup failure.

30. The system according to claim 28, wherein the restart generation component is operable to apply a number of restart trials to the motor after detection of a startup failure.

31. The system according to claim 30, wherein the restart generation component is operable to selectively set a time interval between restart applied to the motor after detection of a startup failure.

* * * * *